J. CHURCHWARD.
PYROMETER.
APPLICATION FILED MAR. 22, 1911.
1,069,318.
Patented Aug. 5, 1913.
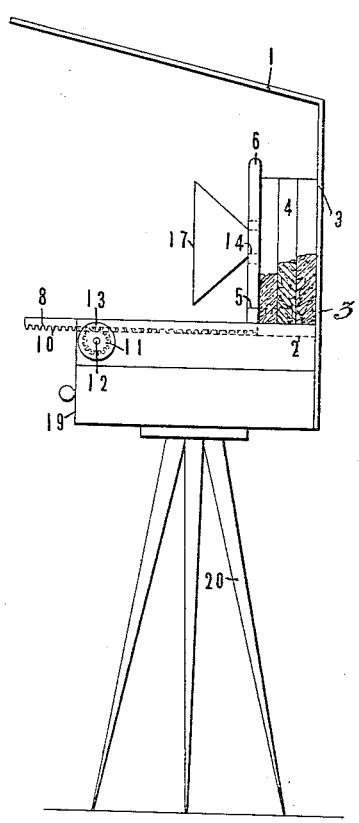
Fig.1.
Fig.2.
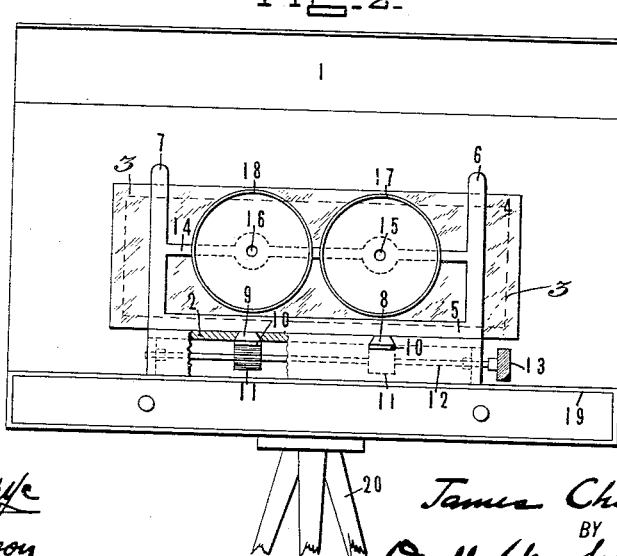
WITNESSES
INVENTOR
James Churchward
BY
Drull, Warfield & Drull
ATTORNEYS

UNITED STATES PATENT OFFICE.

JAMES CHURCHWARD, OF MOUNT VERNON, NEW YORK, ASSIGNOR TO CHURCHWARD INTERNATIONAL STEEL COMPANY, OF NEW YORK, N. Y., A CORPORATION OF DELAWARE.

PYROMETER.

1,069,318.  Specification of Letters Patent.  Patented Aug. 5, 1913.

Application filed March 22, 1911. Serial No. 616,052.

*To all whom it may concern:*

Be it known that I, JAMES CHURCHWARD, a subject of the King of England, residing at Mount Vernon, in the county of Westchester and State of New York, have invented certain new and useful Improvements in Pyrometers, of which the following is a full, clear, and exact description, such as will enable others skilled in the art to which it appertains to make and use the same.

This invention relates to heat measuring instruments, and with respect to its specific features, to an optical pyrometer adapted to be used in measuring the temperature of glowing bodies.

One of the objects of the invention is to provide a means whereby the temperature may be measured by direct observation of the glowing body.

Another object of the invention is to provide a means whereby the temperature of a glowing body may be accurately measured by observing the color of the rays emitted.

Another object is to provide a mounted apparatus of the kind described which may be used in close proximity to the source of heat.

Another object is to provide a practical and efficient apparatus of the kind described which may be easily transported from place to place.

Another object is to provide a simple apparatus of the kind described which shall be compact and inexpensive.

Other objects will be in part obvious and in part pointed out hereinafter.

The invention accordingly consists in the several steps and the relation and order of one or more of such steps with relation to each of the others thereof, and in the features of construction, combinations of elements and arrangement of parts which will be exemplified in the method hereinafter disclosed and the construction hereinafter set forth, and the scope of the application of each of which will be indicated in the following claims.

In the accompanying drawings, wherein is shown one of various possible embodiments of the invention, Figure 1 represents a front elevation showing the apparatus mounted on a tripod; and Fig. 2 represents a side partially sectional elevation thereof.

Similar reference numerals refer to similar parts in the various views of the drawings.

In order to render the invention clearer it is to be noted that the color and intensity of rays proceeding from glowing bodies varies in general with the temperature thereof and the general conditions under which the bodies are subjected to heat. Experiment indicates that the various shades of a glowing body at different temperatures, from white through orange, orange red, and so on, may be changed to a standard shade of red by passing these rays through a semi-opaque member, and that the temperature of the body varies proportionately with the degree of opacity required to reduce the rays to this standard shade of red. The apparatus hereinafter described as embodying the invention includes as one of its principal features a series of plates having various degrees of translucency, each plate being standardized to represent a certain fixed temperature.

The red rays emanating from a bath of aluminum at its melting point, approximately 625° C., have been chosen as a standard of comparison for all substances. This selection of aluminum is an arbitrary matter and other metals may be used in its place.

In carrying out the standardization of the plates mentioned a naked bath of aluminum at its melting point is prepared and the standard noted. The standard shade may be kept in mind by an operator who has had suitable experience with the apparatus, but under certain circumstances a red medium matching the shade of the standard red rays may be employed and the shade of the rays emanating from a glowing body be compared therewith. The temperature of the bath is then raised to an arbitrary point, say 50° above the melting point and the molten metal is then observed through a previously blackened glass plate. If the blackened glass plate has an opacity greater or less than that corresponding to the temperature of the bath the rays will appear other than the standard red emanating at the melting point of the aluminum. The plate must then be treated by addition or removal of blackening substance until the rays emanating from the metal at the point selected are the same color as those emanating at its melting point. The plate so blackened will have an opacity corresponding to a temperature 50° above the melting point of the metal. The bath is now raised to a point 50° higher than this latter temperature and another plate is standardized in the same manner to record this temperature accurately. The standardization may be continued to any desired point, depending upon the temperature at which measurements are to be taken in practice. The successive temperatures of the bath of molten metal employed in standardization may be ascertained in any convenient manner, for example, by means of an electric pyrometer. Of course it is to be understood that the plates may be standardized to represent any temperature and that the plates of a given scale may vary from one another by any number of degrees—this being purely a matter of choice. The series of plates so prepared are particularly fitted for use when measuring the temperature of aluminum but will give an approximately correct temperature reading for other substances having the same general nature. For very accurate readings, however, a set of plates standardized for the particular substance with which it is to be used, should be employed.

The pyrometer may be used upon solids, liquids and gases, liquids and gases being standardized by observing, as in the case of the solids mentioned, the rays emitted from these bodies when glowing, eliminating therefrom all but the standard red rays by blackened plates and thereby forming a set of standardized plates to be used in determining the temperature of the gas or liquid.

The apparatus necessary in the use of the standardized plates as shown in the drawings is very simple. It includes a fixed frame comprising an asbestos hood 1, which surrounds it on two sides, and a flooring 2. An opening 3 is provided in the front face of the hood and the standardized plates 4 are placed in juxtaposition to this opening. The plates are sufficiently large to bear against the walls surrounding the opening and are held in place by a movable guide which comprises a strip 5, upright members 6 and 7 and rabbets 8 and 9. This guide may be moved back and forth with respect to the fixed floor by means of teeth 10 formed on the rabbets, which mesh with pinions 11 attached to a rod 12 having a knob 13 whereby the pinions may be turned to move the rabbets. Between the upright members of the movable guide passes a transverse member 14 provided with eye holes 15 and 16 and these in turn are provided with shields 17 and 18 attached to said member. The fixed frame is provided with a drawer 19 situated below the floor, and the whole device may be mounted upon a tripod 20, as shown.

In the operation of the device it may be placed in close proximity to the source of heat without inconvenience to the observer, and the observations may be made directly upon the glowing substances. In ascertaining the temperature of a body a standardized plate is placed in front of the aperture in the asbestos frame and is suitably supported by the movable guide. An observation is then made upon the heated body, and if the opacity of the plate is insufficient to eliminate all rays other than those giving a standard red shade the opacity is adjusted either by inserting another plate and observing the source of heat through the two in conjunction or else by inserting a single plate of greater opacity. When a plate or plates of such a degree of opacity have been inserted that substantially all rays passing from the body have been eliminated except those giving the standard red ray the number and kind of plates used to produce this standard red are noted, and since each standardized plate represents, according to its standarized value, a certain fixed temperature, the temperature of the body under observation may be ascertained by adding together the temperatures represented by each plate.

It is to be understood that, although the plates herein mentioned are made of glass and blackened, that members of any material and having a suitable color might be used. Blackened plates appear preferable owing to the fact that black does not combine with the various colors given off by glowing bodies to produce false shades and tints.

The apparatus provides a device which may be easily carried from place to place. It is simple and compact. There are few parts to get out of order, and it is a matter of only a moment to set it up and take observations. The asbestos hood secures a protection from heat while making observations, and the tripod affords a means for setting the instrument at various heights so that the apparatus may be placed in a convenient position for use.

As many changes could be made in carrying out the above method, and in the above construction, and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent, is:

1. A process of the nature disclosed, which consists in passing the rays of a glowing body through a medium having an adjustable opacity and thereby eliminating all of said rays except those representing a certain standard shade whereby the temperature of said body may be determined.

2. A process of the nature disclosed which consists in observing the rays of a glowing body through a medium having an adjustable opacity, eliminating all of said rays except those having a standard shade whereby the temperature of said body may be determined.

3. A process of the nature disclosed, which consists in passing the rays of a glowing body through a medium having an adjustable opacity, each adjustment thereof representing a certain temperature and adjusting said opacity whereby the temperature of said body may be ascertained.

4. A process of the nature disclosed, which consists in passing the rays of a glowing body through a medium having an adjustable opacity, each adjustment thereof representing a certain temperature and adjusting said opacity to bring the color of said rays to a predetermined shade whereby the temperature of the glowing body may be ascertained.

5. A process of the nature disclosed which consists in passing the rays of a glowing body through a medium having an adjustable opacity and adapted to eliminate all rays except red and adjusting the opacity of said member to bring the color of said rays to a standard shade of red whereby the temperature of the glowing body may be ascertained.

6. A process of the nature disclosed, which consists in passing the rays of a glowing body through one or more of a series of plates having various degrees of opacity, each plate having an opacity representing a certain temperature, and adjusting the opacity of said plates so that all rays except those of a standard red passing therethrough are eliminated whereby the temperature of the glowing body may be ascertained.

7. A process of the nature disclosed, which consists in passing the rays of a glowing body through one or more of a series of blackened plates having varying degrees of opacity, each plate having an opacity representing a certain temperature and adapted to eliminate certain rays emanating from said body and adjusting the opacity of said plates so that only certain rays pass therethrough whereby the temperature of the glowing body may be determined.

8. A process of the nature disclosed, which consists in passing the rays of a glowing body through one or more of a series of blackened plates having varying degrees of opacity, each plate having an opacity representing a certain temperature and adapted to eliminate all rays except red rays emanating from said body and adjusting the opacity of said plates so that only standard red rays pass therethrough whereby the temperature of the glowing body may be ascertained.

9. In an apparatus of the character described, in combination, a medium having an opacity adapted to be adjusted with respect to the rays emanating from a glowing body, and means adapted to permit the adjustments of said opacity whereby the temperature of the glowing body may be ascertained.

10. In an apparatus of the character described, in combination, a blackened medium having an opacity adapted to be adjusted with respect to rays emanating from a glowing body and adapted to eliminate all rays except standard red rays passing therethrough, and means adapted to permit adjustments of the opacity of said member whereby the temperature of the glowing body may be ascertained.

11. In an apparatus of the character described, a series of blackened plates, each having a certain degree of opacity, each of said plates having an opacity representing a certain temperature, and a heat-insulating shield associated with said plates.

12. In an apparatus of the character described, in combination, a fixed frame comprising an asbestos hood having an opening, a series of blackened plates constituting a standard scale for temperature measurements and adapted to be placed in juxtaposition to said opening, and a movable guide adapted to adjustably support said plates.

13. In an apparatus of the character described, in combination, a fixed frame comprising an asbestos hood having an opening, a series of blackened plates constituting a standard scale for temperature measurement and adapted to be brought into juxtaposition to said opening, a movable guide adapted to support said plates comprising upright members provided with toothed rabbets, and means to adjust the position of said movable support with respect to said opening comprising a rod and pinions secured on said rod adapted to mesh with said rabbets and thereby move said guide backward or forward.

14. A process of the nature disclosed which comprises viewing a glowing body through one or more members having an opacity, or opacities, standardized to represent certain temperature values and constituting a standardized medium and changing the opacity of the standardized medium so that the rays emanating from the body and viewed therethrough appear of a standard predetermined shade.

15. A process of the nature disclosed, which consists in eliminating from a glowing body a measured portion of the rays which give its naked glowing appearance so that the remaining rays produce a shade having an ascertainable relation to temperature.

16. A process of the nature disclosed, which consists in eliminating from a glowing body such measured portions of the rays which give its naked glowing appearance that the remaining rays produce a shade indicating a standard temperature.

In testimony whereof I affix my signature, in the presence of two witnesses.

JAMES CHURCHWARD.

Witnesses:
J. THOMSON,
L. A. WATSON.

Copies of this patent may be obtained for five cents each, by addressing the "Commissioner of Patents, Washington, D. C."